United States Patent Office

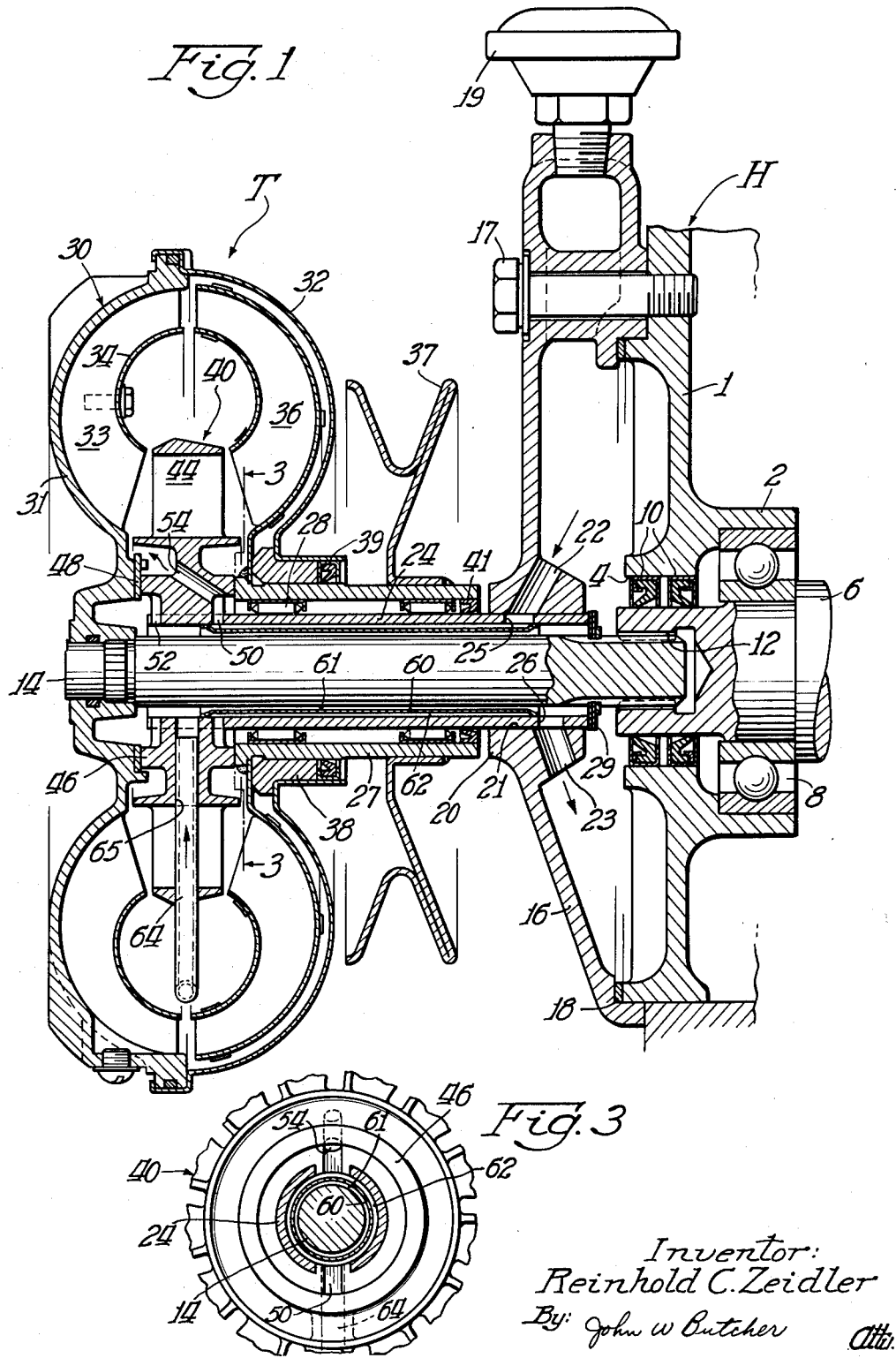

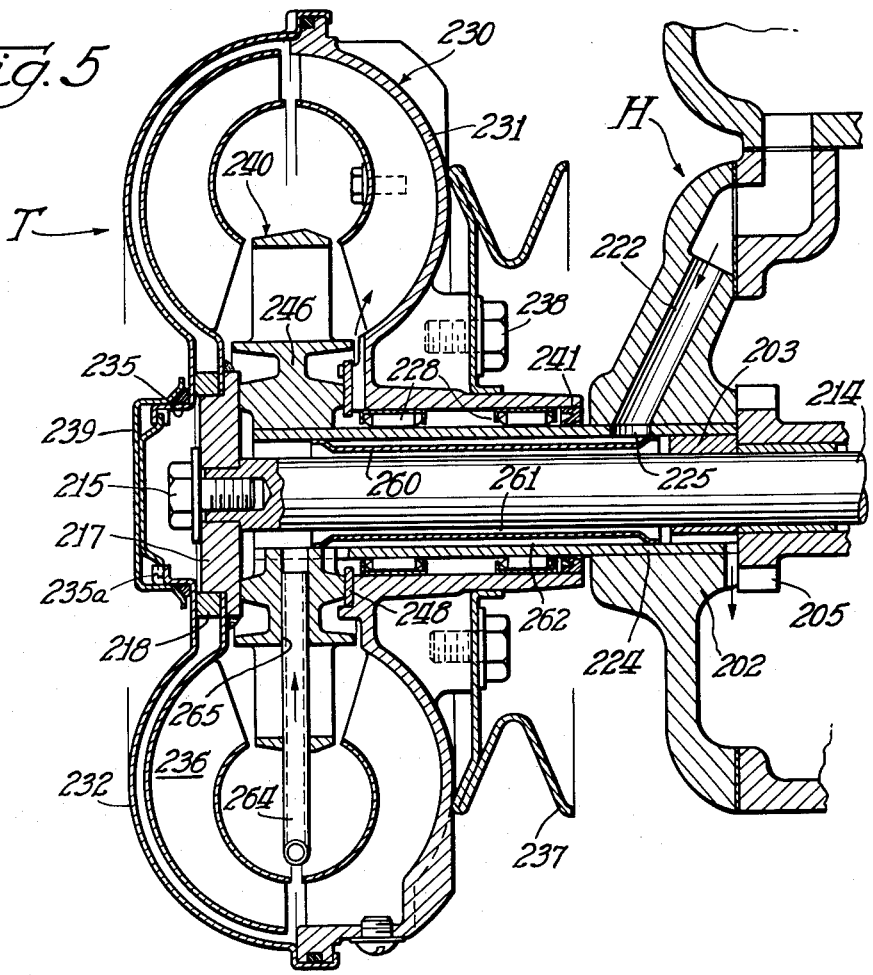
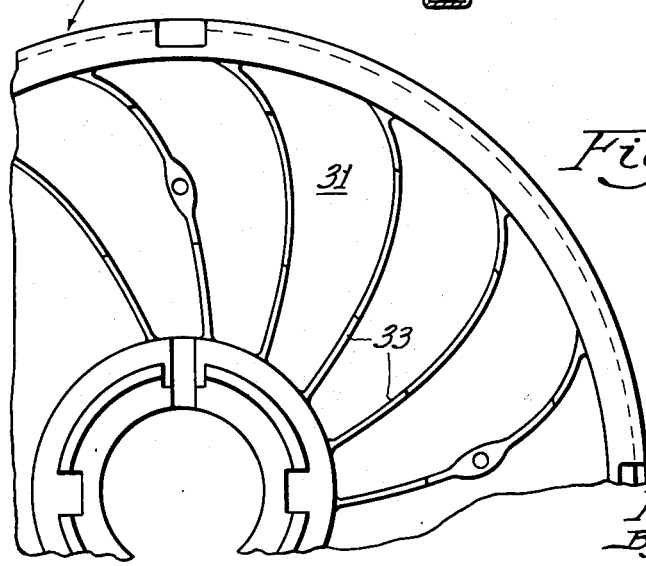

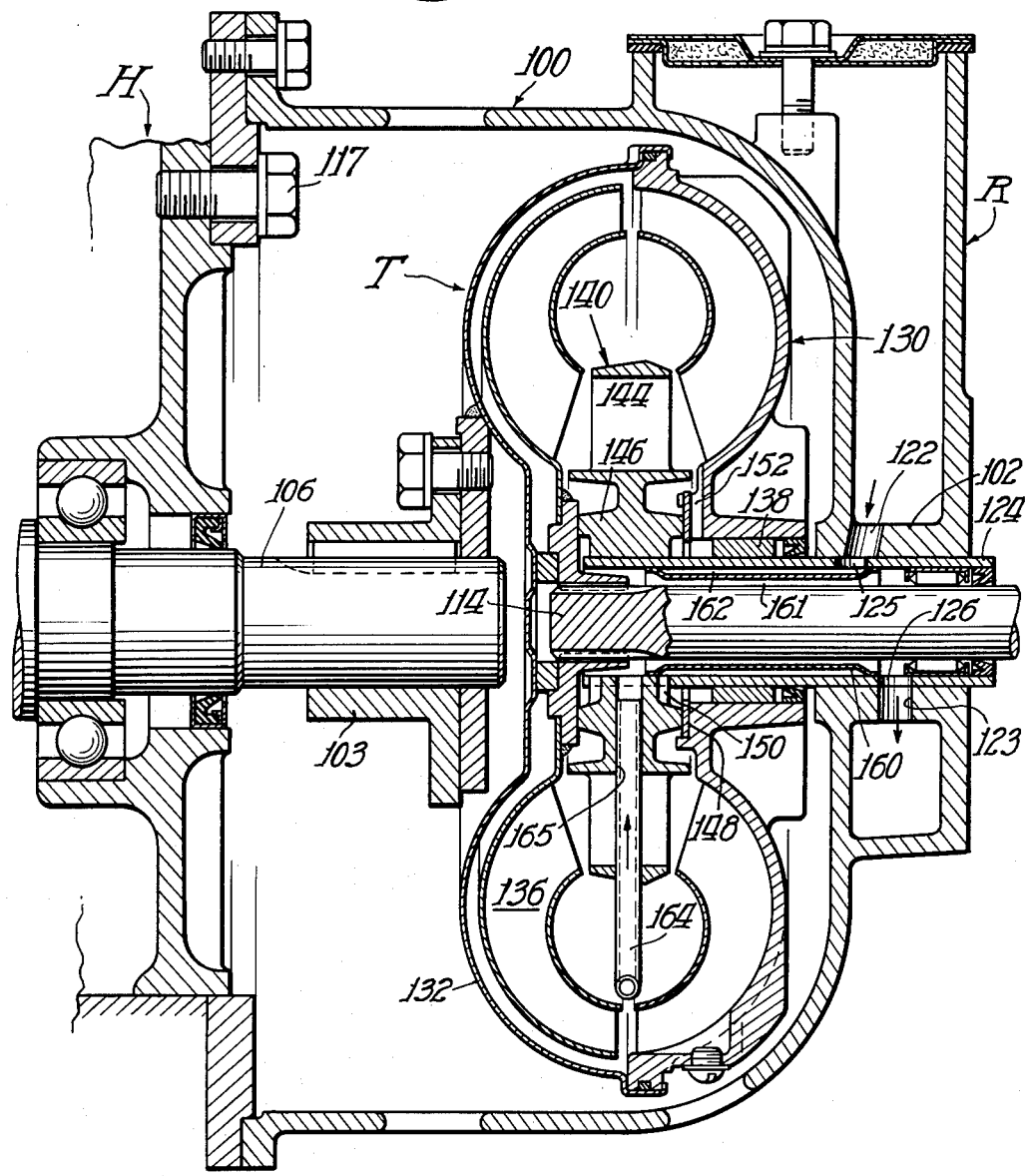

3,204,412
TORQUE CONVERTERS

Reinhold C. Zeidler, Detroit, Mich., assignor to Borg-Warner Corporation, Chicago, Ill., a corporation of Illinois
Filed June 25, 1962, Ser. No. 205,037
3 Claims. (Cl. 60—54)

This invention relates in general to hydrodynamic torque transmitting devices, more specifically to infinitely variable torque multiplying devices for use in the drive systems of garden tractors, golf carts, utility vehicles, or other products powered by small engines.

In mechanisms which ordinarily employ small, low horsepower engines, the drive systems used for multiplying torque are commonly in the form of a pair of adjustable sheaves connected by a wide belt and often include a centrifugal clutch. The sheaves automatically adjust their effective diameters to load requirements so that there is a high mechanical advantage when the load is heavy or the apparatus is started on a grade and a low mechanical advantage when the load is light. To prevent stalling of the engine when the vehicle is brought to a stop, the centrifugal clutch automatically disengages the engine from the drive system.

Although this type of drive does provide automatic clutching and an infinite number of ratios within a particular range, it is subject to the usual complaints associated with frictional devices. Belts and clutches slip and wear out; adjustments are needed; shock loads and torsional impulses are not readily absorbed; and response to varying load conditions is extremely slow.

Other drive systems frequently use belts and sheaves, often combined with gearing, to provide different drive ratios. These ratios, however, are fixed and therefore are not self-adjusting. Moreover, this type of drive often makes use of the belt tension, using the belt as a clutch to start the vehicle in motion. Needless to say, belt life is unsatisfactorily short; and it is difficult, if not impossible, to put such a vehicle into motion smoothly.

The present invention relates to an infinitely variable torque multiplying device which transmits power by the dynamic fluid action of fluid flowing in a substantially closed, generally circular path defined by an impeller, a reaction element, and a turbine. It should be emphasized that the present invention is not a hydrostatic device or fluid coupling; it is fully capable of multiplying torque within the range of about 1:1 to about 2.4:1. In this conversion range, the torque multiplying devices constructed in accordance with the present invention have a maximum efficiency approaching 90 percent.

To obtain the advantages afforded by this invention, a torque converter has been provided which includes a plurality of rotatable vaned elements and a reactor element together defining a substantially toroidal fluid circuit, said rotatable vaned elements consisting of impeller means and turbine means. A first shaft is connected to either the impeller means or the turbine means depending on whether said shaft is employed as the input shaft or the output shaft. A second shaft, a fixedly mounted reactor sleeve, is disposed generally concentrically around said first shaft, and a third shaft is rotatably supported concentrically around said second shaft. This third shaft is connected to the other of said rotatable vaned elements. Obviously, if the first shaft is the output shaft, it will be connected to the turbine means while the third shaft will be connected to the impeller means and vice versa. The second shaft supports the reaction element and is always stationary so that substantially all of the loading normal to the axes of said shafts is absorbed by the second shaft, thus minimizing the transverse loading on the input and output shafts.

In order to assure positive circulation of fluid through the system without having to resort to the use of a pump, a novel circulatory system has been provided. This system includes a flow divider sleeve, dividing the annular space between the first and second shafts into fluid and discharge passages, and an impact tube communicating with the discharge passage. The impact tube picks up fluid circulating within the torque converter housing and delivers it into the discharge passage under pressure.

It is therefore a primary object of the present invention to provide a small, low-cost torque converter having a simple and rugged design.

It is another object of the invention to provide a torque converter having an improved fluid circulation system which does not require the usual complex and expensive pumping unit.

It is another object of the invention to provide a three member torque converter having a rigidly mounted reactor sleeve shaft to reduce radial loading on the input and output shafts.

Other and more particular advantages and objects will be apparent from the following detailed description and appended drawings wherein:

FIGURE 1 is a cross-sectional view of a torque converter constructed in accordance with the general principles of the present invention;

FIGURE 2 is a partial plan view of the impeller section of the torque converter housing;

FIGURE 3 is a cross-sectional view taken along the plane of line 3—3 in FIGURE 1;

FIGURE 4 is a cross-sectional view showing another modification of a torque converter constructed in accordance with the general principles of the present invention; and FIGURE 5 is a cross-sectional view of another modification of a torque converter.

Referring now to FIGURE 1, the torque converter T is designed to be secured directly to a conventional small horsepower gasoline engine. The typical engine includes a housing H having an end wall 1 which is provided with a boss 2 having a bore 4 extending therethrough, said bore being adapted to accommodate the engine output shaft. The engine output shaft 6 extends at least partially through the bore and is normally supported by roller bearings 8 mounted within the boss on the inside of the housing. Oil seals 10 of any conventional type are positioned around the shaft in the annular space between bore 4 and shaft 6. The shaft 6 is internally splined at 12 to receive an externally splined shaft 14 adapted to drive the torque converter impeller.

An open-ended housing 16 is connected by a plurality of bolts 17 directly to the engine housing wall 1 to provide the oil reservoir. It will be noted that the oil reservoir is formed in part by engine housing wall 1 and in part by housing 16. A gasket 18 may be positioned between housing 16 and the engine housing to seal the reservoir. The reservoir also includes a filter and vent cap 19 at the upper portion thereof which is adapted to be removed for the purpose of adding oil to the reservoir.

The reservoir housing wall 16 has a central boss 20 which is provided with an axially extending bore 21 and a pair of drilled holes 22, 23 intersecting said bore respectively above and below the central axis of said bore. A stationary sleeve 24, occasionally referred to as a reactor sleeve, is fixedly mounted within the axially extending bore 21 and is provided with a pair of apertures 25, 26 registering with the drilled holes 22, 23 in the boss portion of the reservoir housing wall. The reactor sleeve 24 extends outwardly from the housing wall 16 and has a sleeve 27 rotatably supported thereon by sets of needle bearings 28.

The drive shaft 14 for the torque converter is positioned concentrically within the reactor sleeve and includes a first end splined and connected to the output shaft 6 of the engine. A thrust washer 29 is preferably mounted on the splined portion of the drive shaft and keyed thereto, said thrust washer being in running engagement with the end portion of the reactor sleeve.

The torque converter housing, generally indicated by the numeral 30, is formed by two mating sections, a die cast impeller section 31, and a cover section 32. The impeller section 31, sometimes referred to herein as the impeller means, includes a plurality of integral, curved, radially extending vanes 33 and a core ring 34, bolted or otherwise connected to the intermediate portion of said vanes. The cover section 32 is joined to the impeller at their respective peripheries, and the central portion of the section is joined to an annular bearing ring 38. Bearing ring 38 is supported on the sleeve 27 and is freely rotatable thereon. A conventional seal 39, fitted within the cover section flange, controls oil leakage between the bearing ring and the sleeve 27.

The turbine means 36, the other of the rotatable vaned elements, includes a plurality of curved, radially extending vanes and a centrally located core ring in substantially the same relationship as the impeller means. While it is possible to die cast the turbine as well as the impeller, it is generally preferred to fabricate the turbine out of sheet metal stampings in a manner well known in the art.

It will be noted that the turbine 36 and the belt sheave 37 are welded or otherwise secured to opposite ends of the sleeve 27. The kinetic energy of fluid circulated within the torque converter housing by the engine driven impeller provides the motive force for propelling the turbine around on the reactor sleeve 24 and driving the sleeve 27 and belt sheave 37. The sheave 37 is adapted to be connected by a conventional V-belt directly to the drive wheels of a small vehicle or to any other system receiving the drive.

A reactor element 40 is fixedly mounted on one end of the reactor sleeve 24 and includes an annular mounting ring 46 and a plurality of stator vanes 44 extending radially outwardly from said mounting ring. The mounting ring has a front portion in running engagement with a bearing ring 48 secured to the impeller and a rear portion in running engagement with the front surface of the rotatable sleeve 27. The mounting ring further includes a set of grooves 50, 52 respectively situated along the inner and outer faces of its radially innermost portion and an angularly disposed fluid passage 54 running from adjacent the annular space between the sleeve shaft and the reactor sleeve upwardly to a point just below the stator vanes 44 on the opposite side of said mounting ring.

A fixed flow divided sleeve 60 is positioned between the drive shaft and the reactor sleeve running from a point on the engine side of the upper drilled hole 25 forwardly to a point intermediate the base of the mounting ring 46. The flow divider sleeve forms outer 62 and inner 61 annular fluid passages to provide flow paths for transmission oil to and from the torque converter housing.

An impact tube 64 extends into a bore 65 in the mounting ring generally perpendicular to the axis of rotation of the torque converter elements. This tube has a first terminal portion extending downwardly within the toroid formed between the impeller and the turbine and a second terminal portion disposed adjacent the end of the drive shaft and in fluid communication with the inner annular passage 61.

Torque converter fluid such as, for example, transmission oil is supplied from the reservoir through the upper drilled hole 22 in the boss portion of the housing 16 by way of the aperture 25 in the reactor sleeve into the outer annular passage 62 defined between the divider sleeve and the reactor sleeve. Fluid communication between said outer annular passage and the interior of the torque converter housing is provided by the grooves 50 (FIGURE 3) in the inner face of the mounting ring and the fluid passage 54 in the mounting ring. Fluid is withdrawn from the fluid circuit through the impact tube 64, and flows upwardly through the drilled hole 65 normal to the axis of the shaft, and into the inner annular passage 61 between the flow divider sleeve and the drive shaft. Fluid is returned to the reservoir through the drilled hole 26 in the reactor sleeve and the aperture 23 in the boss portion of the reservoir housing wall.

Transmission fluid, ordinarily a light weight mineral oil, is continuously circulated throughout the system by means of fluid being picked up by the impact tube and continuously withdrawn through the inner annular discharge passage. The pressure head adjacent the inlet opening in the reservoir housing boss portion is sufficient to gravity feed the system in a continuous manner to maintain constant circulation.

Referring now to FIGURE 2, there is shown a partial plan view of the impeller unit 30. The impeller portion of the torque converter is preferably die cast using a two dimensional die. This preferred arrangement enables the same basic die members to be used to manufacture an impeller with blades suitable for clockwise or counterclockwise rotation by utilizing an outer die insert member with a clockwise type blade curvature or an outer die insert member with a counterclockwise type blade curvature. Likewise the same basic die member may be used to manufacture impeller units with an extended hub portion as illustrated in FIGURES 4 and 5 or with a shortened hub portion as illustrated in FIGURE 1 by using an inner die insert member suitable for the desired hub configuration.

By die casting the entire impeller unit, substantial savings in cost are obtained. The intermediate portions of each vane are cut out to receive the core ring which is adapted to be connected to certain of said vanes which have thickened intermediate portions having a tapped hole. The opposite side of the impeller assembly may be provided with a plurality of cooling fins for the dissipation of heat generated within the torque converter housing. Since the entire torque converter assembly is exposed to ambient atmosphere during rotation thereof, the accumulation of heat is minimized.

Illustrated in FIGURE 4 is another torque converter design embodying the principles of the present invention.

In this modification, the engine and the output shaft are on opposite sides of the torque converter. A housing 100, within which the torque converter T is mounted, also includes the transmission oil reservoir R as an integral part thereof. The torque converter housing 130 may be attached directly to the engine housing H by means of bolts 117 or in any other suitable manner with the engine output shaft 114 extending well into the housing.

The cover section 132 of the torque converter housing 130 is connected directly to the engine drive shaft 106 by means of a collar arrangement 103 keyed to said shaft. The impeller means 131 is on the opposite side of the torque converter housing and is rotatably supported on bearing means 138 mounted on the reactor sleeve 124. The turbine means 136 is mounted on the output shaft 114 on the engine side of the converter, said output shaft being arranged and supported concentrically within the reactor sleeve 124 by a set of needle bearings.

The reactor element 140 is fixedly mounted adjacent one end of the reactor sleeve 124, said reactor element comprising a mounting ring 146 and a plurality of vanes 144 extending generally radially outwardly therefrom. The reactor element is formed with at least one groove 150 on one face thereof for the passage of transmission oil. In this case, however, the angularly drilled hole through the mounting ring is not necessary since the transmission oil is delivered to the righthand side of the converter housing and passes into the fluid circuit through a groove 152 cut in the face of the impeller. The reactor mounting ring 146 includes an enlarged portion in running engagement with the turbine means on one side and a bearing ring 148 connected to the impeller housing on the other.

A flow divider sleeve 160 similar to that described in connection with FIGURE 1 is positioned between the reactor sleeve and the output shaft. Transmission oil is delivered from an upper drilled hole 122 in the reservoir housing boss 102, through aperture 125, into the outer annular fluid passage 162 between the flow divider sleeve and the reactor sleeve. From the outer annular passage, oil is directed via groove 150 on the side of the mounting ring between the reactor sleeve and the bearing ring, through a slot 152 in the impeller housing wall and into the fluid circulation system inside the torque converter housing.

Fluid is picked up by the impact tube 164, passes through the drilled hole 165 in the mounting ring 146, and is delivered into the inner annular passageway 161, and is discharged into the reservoir through registered apertures 126, 123 in the reactor sleeve and the reservoir boss.

With certain modifications, it is possible to transform the basic torque converter illustrated in FIGURE 1 into a side input transmission or transaxle. As shown in FIGURE 5, the torque converter T may be connected directly to the transmission housing H so that the oil reservoir, located in the upper portion of the transmission, can be conveniently made a part of said transmission.

A reactor sleeve 224 is supported directly by the transmission housing. The impeller section 231 of the torque converter housing 230 is mounted for rotation on said reactor sleeve by two sets of needle bearings 228 and includes a conventional oil seal 241 in sealing engagement with said reactor sleeve. Connected directly to the impeller section 231 is a power input belt sheave 237 attached by means of a plurality of bolts 238 or in any other suitable manner. The sheave may be driven by a V-belt directly from the gasoline engine.

The output shaft 214 is supported for rotation within the reactor sleeve on a bearing ring 203 and has one end connected to one of the gears 205 in the transmission. The turbine means 236 is connected to the other end of said output shaft 214 by a bolt 215 extending through an annular support block 217. An annular bearing ring 218 in running engagement with the turbine cover section 232 is mounted on a shoulder of said support block.

The cover section 232 of the torque converter housing is provided with a central access aperture 235, which is adapted to be closed and sealed by a closure cap 239, similar to a conventional radiator cap, attached to the inwardly extending flange 235a of said access aperture.

The reactor element 240 is mounted on one end of the reactor sleeve 224 in a manner similar to that described with respect to FIGURES 1 and 2 and includes a mounting ring 246 having a thickened portion in running engagement with both the support block 217 on the turbine and an annular bearing ring 248 mounted on the inner face of the impeller. The mounting ring is also provided with a drilled hole 265 extending normal to the axis of the output shaft for the reception of one end of the impact tube 264.

The fluid circulation system is basically the same as that described in regard to the other modifications in that a sleeve member 260 is positioned in the annular space between the output shaft and the reactor sleeve, said sleeve member forming a first outer annular fluid inlet passage 262 and an inner annular fluid discharge passage 261. Transmission oil is fed by gravity through an angularly drilled passageway 222 in the transmission housing which registers with an aperture 225 in the reactor sleeve. Fluid passes through the outer annular fluid passage 262 defined by said sleeve through a groove in the face of the mounting ring and from there passes through a slot provided in the inner face of the impeller unit between the bearing ring and the main body of said impeller unit. Fluid is picked up by the impact tube 264 and delivered through the drilled hole 265 in the mounting ring into the inner annular fluid passage defined by the sleeve and flows through a small groove cut in the output shaft support bearing and finally through a drilled hole in the reactor sleeve and into the transmission.

With regard to the embodiments disclosed in FIGURES 1 and 5 respectively, the drive or power transmitting member carried by the outer sleeve shaft (i.e., V-belt sheave 37 in FIGURE 1 and sheave 237 in FIGURE 5) is subjected to relatively high radial loading. This is inherent in the type of drive system and would also be inherent in a chain or spur gear drive, the latter being a result of gear tooth separation thrust. As pointed out in the statement of objects, one aspect of the present invention relates to an arrangement for minimizing the radial loads on the input and output shafts. In the mounting arrangement shown in FIGURES 1 and 5, the radial loads are taken on the stationary reactor sleeve shaft which is fixedly supported by either the motor housing or the gear box housing.

While the invention has been disclosed in connection with certain specific embodiments, it should be understood that these are by way of example rather than limitation, and it is intended that the invention be defined by the appended claims which should be given a scope as broad as consistent with the prior art.

What is claimed is:

1. In a hydraulic torque converter of the type wherein the input and output shafts extend from the same side of the torque converter, the combination comprising a plurality of rotatable vaned elements and a reactor element together defining a substantially toroidal fluid circuit, said rotatable vaned elements comprising impeller means and turbine means; an input shaft connected to said impeller means; a second shaft connected to said reactor element, said second shaft comprising a rigidly supported sleeve shaft; an output shaft connected to said turbine means, said output shaft comprising a sleeve shaft rotatably journaled on said second shaft, said input shaft being arranged concentrically within said second shaft, said second shaft being arranged concentrically within said output shaft; means defining first and second fluid inlet passages respectively interconnecting with said fluid circuit; a power transmitting member normally subjected to radial loading carried by said output shaft; and a rotatable toroidal housing connected to said impeller means, said rotatable toroidal housing including an annular portion journaled on and supported by said output shaft.

2. An apparatus as defined in claim 1 wherein said input shaft is connected to and supported by said rotatable toroidal housing.

3. In a hydraulic torque converter of the type wherein the input and output shafts extend from the same side of the torque converter, the combination comprising a plurality of rotatable vaned elements and a reactor element disposed within a rotatable housing together defining a substantially toroidal fluid circuit, said rotatable vaned elements comprising impeller means and turbine means; an input shaft connected to said impeller means; a second shaft connected to said reactor element, said second shaft comprising a rigidly supported sleeve shaft; an output shaft connected to said turbine means, said output shaft comprising a sleeve shaft rotatably journaled on said second shaft by spaced apart bearing means positioned between said output shaft and said second shaft, said input shaft being arranged concentrically within said second shaft, said second shaft being arranged concentrically within said output shaft; means defining first and second fluid inlet passages respectively interconnecting with said fluid circuit; and a power transmitting member normally subjected to radial loading carried by said output shaft; said input shaft being connected to said rotatable housing, said rotatable housing being rotatably journaled on said output shaft by bearing means positioned between said rotatable housing and said output shaft.

References Cited by the Examiner

UNITED STATES PATENTS

| 1,963,720 | 6/34 | Sinclair | 60—54 |
| 2,149,369 | 3/39 | Sinclair | 60—54 |
| 2,393,862 | 1/46 | Miller | 60—54 |
| 2,679,728 | 6/54 | Trail | 60—54 |
| 2,710,504 | 6/55 | Dodge | 60—54 |
| 3,079,756 | 3/63 | Farrell | 60—54 |
| 3,118,279 | 1/64 | Goudy | 60—54 |

FOREIGN PATENTS 663,463 12/51 Great Britain.

JULIUS E. WEST, *Primary Examiner.*